(12) United States Patent
Barimani et al.

(10) Patent No.: US 10,822,754 B2
(45) Date of Patent: Nov. 3, 2020

(54) EARTH WORKING MACHINE HAVING AN OPERATING CONSOLE WITH IMPROVED VANDALISM PROTECTION

(71) Applicant: Wirtgen GmbH, Windhagen (DE)

(72) Inventors: Cyrus Barimani, Königswinter (DE); Christian Berning, Zülpich (DE); Stephan Drumm, Ockenfels (DE)

(73) Assignee: Wirtgen GmbH (DE)

( * ) Notice: Subject to any disclaimer, the term of this patent is extended or adjusted under 35 U.S.C. 154(b) by 89 days.

(21) Appl. No.: 16/212,925

(22) Filed: Dec. 7, 2018

(65) Prior Publication Data

US 2019/0186089 A1 Jun. 20, 2019

(30) Foreign Application Priority Data

Dec. 18, 2017 (DE) .......................... 10 2017 223 126

(51) Int. Cl.
*E01C 23/088* (2006.01)
*E02F 9/20* (2006.01)
(Continued)

(52) U.S. Cl.
CPC .......... *E01C 23/088* (2013.01); *E01C 23/127* (2013.01); *E02F 9/2004* (2013.01);
(Continued)

(58) Field of Classification Search
CPC .. E01C 2301/30; E01C 23/088; E01C 23/127; E01C 2301/00; E21C 47/00;
(Continued)

(56) References Cited

U.S. PATENT DOCUMENTS 2,876,857 A * 3/1959 Beyerstedt ............. B60K 37/02
180/90
3,302,743 A * 2/1967 Mosquera .............. B60K 37/02
180/90
(Continued)

FOREIGN PATENT DOCUMENTS

CN 209816620 U 12/2019
DE 4308556 A1 9/1994
(Continued)

OTHER PUBLICATIONS

Search Report for corresponding European Patent Application No. 18211381.1 dated Jan. 29, 2019, 8 pages (not prior art).
(Continued)

*Primary Examiner* — David J Bagnell
*Assistant Examiner* — Michael A Goodwin
(74) *Attorney, Agent, or Firm* — Lucian Wayne Beavers; Patterson Intellectual Property Law, PC (57) ABSTRACT

An earth working machine (10), having a propelling unit (22) and a machine frame (12) carried by the propelling unit (22), comprises a working apparatus (32) for earth working; an operator's platform (24), having an operating console (26) comprising a console body (52) and an operating panel (54, 66) that is movable relative to the console body (52) and has at least one operating element (58) associated or associatable with a functional device (32, 39) for control thereof. The operating panel (54, 66) is displaceable into a stowed position in which the at least one operating element (58) is covered by a portion (56*a*, 72*a*) of the console body (52.

19 Claims, 5 Drawing Sheets

(51) Int. Cl.

| | | |
|---|---|---|
| *E01C 23/12* | (2006.01) | |
| *B60K 35/00* | (2006.01) | |
| *B60K 37/06* | (2006.01) | |
| *B60R 7/06* | (2006.01) | |
| *B60R 11/02* | (2006.01) | |
| *B60R 11/00* | (2006.01) | |
| *B60H 1/00* | (2006.01) | |
| *B60K 26/02* | (2006.01) | |

(52) U.S. Cl.
CPC ........ *B60H 1/0055* (2013.01); *B60H 1/00407* (2013.01); *B60K 26/02* (2013.01); *B60K 35/00* (2013.01); *B60K 37/06* (2013.01); *B60K 2026/024* (2013.01); *B60K 2370/128* (2019.05); *B60K 2370/15* (2019.05); *B60K 2370/62* (2019.05); *B60K 2370/67* (2019.05); *B60K 2370/744* (2019.05); *B60K 2700/00* (2013.01); *B60R 7/06* (2013.01); *B60R 11/0235* (2013.01); *B60R 2011/0082* (2013.01); *E01C 2301/30* (2013.01)

(58) Field of Classification Search
CPC ......... E02F 9/20; E02F 9/2004; E02F 9/2008; E02F 9/2012
USPC ... 312/21, 22, 25, 29, 23, 24, 26, 27, 28, 30
See application file for complete search history.

(56) References Cited

U.S. PATENT DOCUMENTS

| | | | | |
|---|---|---|---|---|
| 3,583,519 A | * | 6/1971 | Meyer | B60K 37/00 180/90 |
| 3,913,701 A | * | 10/1975 | Williams | B60K 37/00 180/90 |
| 3,992,070 A | * | 11/1976 | Dunn | B60K 37/00 49/345 |
| 5,165,262 A | | 11/1992 | Brem et al. | |
| 5,190,398 A | | 3/1993 | Swisher | |
| 5,567,004 A | * | 10/1996 | Pietzsch | B60K 35/00 180/326 |
| 6,126,539 A | * | 10/2000 | Miller | B60H 1/2225 454/144 |
| 6,474,431 B1 | * | 11/2002 | Baker | B60K 37/00 180/90 |
| 6,517,138 B1 | * | 2/2003 | Arthur | B60H 1/00985 180/90 |
| 2013/0203333 A1 | * | 8/2013 | Amura | B60H 1/242 454/137 |
| 2013/0270866 A1 | * | 10/2013 | Herzberg | B60K 37/06 296/190.08 |
| 2014/0031954 A1 | * | 1/2014 | Gerhardy | B60K 26/02 700/19 |
| 2019/0186089 A1 | | 6/2019 | Barimani et al. | |

FOREIGN PATENT DOCUMENTS

| | | |
|---|---|---|
| EP | 0810324 A1 | 12/1997 |
| EP | 2650437 A2 | 10/2013 |
| JP | 2009299338 A | 12/2009 |

OTHER PUBLICATIONS

China Office Action for corresponding application No. 201811546669.5, dated Sep. 1, 2020, 10 pages (not prior art).

* cited by examiner

EARTH WORKING MACHINE HAVING AN OPERATING CONSOLE WITH IMPROVED VANDALISM PROTECTION

BACKGROUND OF THE INVENTION

1. Field of the Invention

The present invention relates to an earth working machine, for example a road milling machine, a recycler, a stabilizer, or a surface miner. The earth working machine has propelling unit and a machine frame carried by the propelling unit. It comprises a working apparatus for earth working. Provided on the machine frame is an operator's platform having an operating console for controlling at least one functional device of the earth working machine. The operating console comprises a console body and an operating panel that is movable relative to the console body and has at least one operating element that is associated or associatable with a functional device for control thereof.

2. Description of the Prior Art

An earth working machine of this kind in the form of a road milling machine, in particular a large road milling machine, of the Applicant, is known in the relevant market under the product designation "W 2200". This road milling machine, like other earth working machines, comprises an operating console having a console body and an operating panel that is carried by the console body and is movable relative to the console body so that it can be conveyed, while the earth working machine is operating, into an ergonomically advantageous position for the machine operator who is operating it.

Vandalism is becoming an increasingly frequent problem with earth working machines during times of unmonitored non-use, as unauthorized persons enter construction sites and tamper with machinery parked there. Some persons also attempt to gain access to the operator's platform of an earth working machine. These persons are as a rule motivated not by technical curiosity but by destructiveness, so that there is a great deal of interest in protecting easily damaged, sensitive subassemblies, for example the aforementioned operating panel, as effectively as possible from attack by vandals.

The object of the present invention is therefore to enhance the vandalism resistance of the previously recited earth working machine.

This object is achieved according to the present invention by an earth working machine of the kind recited previously in which the operating panel is displaceable into a stowed position in which the at least one operating element is covered by a portion of the console body, the operating panel being displaceable out of the stowed position into an operating position in which at least one operating element is uncovered by the portion and is therefore accessible for operation thereof by a machine operator.

The accessibility to unauthorized persons at least of the at least one operating element of the operating panel, but preferably of the entire operating panel, in its stowed position can thereby at least be made more difficult.

The "console body" in this context is that body of the earth working machine (also referred to hereinafter simply as a "machine") to which the operating panel is relatively movably connected and by which the operating panel is carried. The console body can consequently be constituted at least partly or in fact entirely by the machine frame and/or by an operator's platform frame. For example, a bottom of the console body can be constituted by the machine frame or, in the case of an operator's platform displaceable relative to the machine frame, by an operator's platform frame or by an operator's platform floor. To avoid misunderstandings, be it noted at this juncture that an operator's platform "displaceable relative to the machine frame" refers here only to an actively displaceable operator's platform that is displaceable relative to the machine frame, either by way of corresponding actuators or manually by the machine operator, between two different relative positions. Operator's platform floors that, in a manner known per se, are connected in merely passively micromovable fashion to the machine frame with interposition of a vibration damping element are "machine frame-mounted" operator's platform floors for purposes of the present Application.

Preferably, however, the console body is embodied at least in portions separately from the machine frame and/or operator's platform frame. As a result, a material that is sufficiently robust for use as a console body, but has a lower density than the material used for the machine frame and/or operator's platform frame, can be selected at least in portions for the separately embodied portion of the console body. The console body is preferably constituted at least in portions from plastic and/or metal. For a given overall volume, a console body portion made of plastic, in particular particle-reinforced and/or fiber-reinforced plastic, has an advantageously low weight along with high strength and high notch toughness. A plastic or plastic composite based on acrylonitrile and styrene, for example acrylonitrile styrene acrylate (ASA) and/or acrylonitrile butadiene styrene (ABS), can preferably be used as a plastic having high vandalism resistance. Particularly preferably, a composite material encompassing ASA and ABS is used in order to exploit the advantageous properties of both materials. The ASA, which has greater resistance to weathering and thermal deformation, is preferably on the outside. A console body portion made of metal likewise exhibits high strength and particularly advantageously can be constituted from parts of the machine frame which as a rule is also made of metal, or can be connected particularly permanently to portions of the machine frame made of metal, for example by welding.

In order to achieve the lowest possible weight, the operating panel can encompass a foamed plastic, in particular foamed polyurethane. This plastic exhibits a particularly advantageous mechanical internal damping. This is advantageous specifically for use in earth working machines that are subject to severe vibration, as road milling machines are. Preferably a basic body of the operating panel encompasses the foamed plastic. An operating element arranged thereon can be constituted from a different plastic and/or from metal.

Because the console body can perform further tasks beyond simply holding the operating panel, for example furnishing a closable storage space, the console body advantageously encompasses an operator's platform-mounted framework part and, in addition to the operating panel, at least one movement part mounted movably thereon. In the interest of good stability and better resistance to external application of force, the console body portion that covers the operating panel in its stowed position is preferably a constituent of the operator's platform-mounted framework part.

In the interest of efficient utilization of installation space, that portion of the console body which covers the operating panel in the stowed position is preferably a wall portion of a housing wall of the console body. In the interest of maximum resistance to forcible attack together with a material density and therefore component weight which are not excessive, that portion of the console body which covers the operating panel in the stowed position is preferably constituted from plastic as discussed above, in particular from ASA/ABS composite plastic.

A possibility in principle is that the operating panel, in its stowed position, is spanned by a portion of the console body, such that the spanning portion can be connected at one or both of its end regions to the operating panel. For example, the operating panel can be guided movably on the portion for relative movement therewith, so that in its stowed position it is covered by the portion, and can be pulled forward and/or rotated forward and/or pivoted forward from beneath the wall portion for displacement into the operating position. In this case, when the operating panel is in its stowed position it can constitute a closed wall region together with the console body portion that covers it; this prevents access to the at least one operating element. One side of the operating panel would not, however, be spanned by the console body and would thus be accessible even in the stowed position. Because sensitive electronics, which can receive control commands from the at least one operating element and convey them to a machine controller, can be located in the operating panel, it is advantageous if the operating panel, in its stowed position, is located entirely in the console body.

In order to achieve maximum vandalism protection for the operating panel, provision can therefore be made that the console body comprises a stowage opening through which the operating panel is displaceable into the stowed position in such a way that the operating panel, in its stowed position, is received completely in the console body. The console body can, so to speak, comprise a storage compartment into which the operating element can be brought into its stowed position without being separated from the console body.

When, as will often be the case, the operating panel is a substantially planar, in particular flat, plate whose thickness dimension is substantially smaller than its dimensions in the principal directions of extent of the planar plate, a comparatively small stowage opening that is adapted to the cross-sectional dimensions of the operating panel (when viewing a cross section in a section plane orthogonal to the movement path between the stowed position and operating position) can already make access to the operating panel in its stowed position sufficiently difficult.

Often, however, the operating panel carries at least one physically protruding operating element, such as an operating lever (joystick), which stands out from the operating panel and whose articulated attachment to the operating panel can in turn be covered by a bellows that also protrudes physically. For displacement of the operating panel into its stowed position, an operating lever of this kind must also be capable of being moved through the stowage opening. This sets limits to how small the stowage opening in the console body can become.

In order to further increase inaccessibility of the operating panel in its stowed position, according to an advantageous refinement of the present invention the operating console therefore comprises a cover, movable between an open position and a locked position, which in its locked position closes off the stowage opening and thereby protects the operating panel, displaced into the stowed position, against unauthorized access and consequently against undesired displacement out of the stowed position. In its open position, the cover exposes the stowage opening for movement of the operating panel. The cover can be an example of an aforementioned movement part of the console body. Preferably the cover is captively arranged, in particular pivotably articulated, on the console body. It is not to be excluded, however, that the cover is removable as a whole from the console body for conveyance into its open position.

Preferably the cover is lockable at least in its locked position using a secure locking means, such as a key or magnetic code and the like, so that the stowage opening can be further protected against forcible opening. At the least, the time that a vandal needs in order to gain forcible access to the operating panel when stowed as intended can be considerably extended; experience indicates that this increases the operating panel's chances of remaining unaffected by a vandalism attack.

The at least one operating element of the operating panel can control any functional device of the earth working machine, for example the drive system and/or the steering system and/or the working apparatus and/or the location and orientation of the machine frame relative to the substrate on which the machine is standing and/or auxiliary apparatuses such as a fan, watering systems, transport apparatuses, and the like. An operating panel will usually comprise more than one operating element so that a plurality of functional devices can be controlled therewith. The at least one operating element can encompass a rocker switch and/or a rotary switch and/or a button and/or a keypad and/or a multi-axis operating lever (joystick) and/or the like.

The machine operator working on the earth working machine is often exposed at least to a limited extent to the weather during his or her activities. Ambient temperature often prevails on the operator's platform, which can be unpleasant for the machine operator on a long-term basis specifically in winter and in transitional seasons. In order to increase the machine operator's working comfort, it is therefore advantageous if the operating console encompasses a convective heating apparatus that is embodied to direct heated air, having a higher temperature than the ambient air temperature, to the operating panel displaced into the operating position. The heated air transported in the convective heating apparatus can be heated by means of a heat exchanger by waste heat of an internal combustion engine or of another functional device that becomes hot during operation.

The heating conduit that conveys heated air can then advantageously be received entirely in the console body. It is therefore not externally accessible. Preferably the convective heating apparatus is embodied to direct heated air from a storage region of the operating console, in particular of the console body, which receives the operating panel in its stowed position, to the operating panel displaced into the operating position.

According to an advantageous refinement, the convective heating apparatus can be embodied to blow air that is heated with respect to ambient air onto the at least one operating element when the operating panel is in an operating position, so that the at least one operating element being blown onto can become warmed. The usual result thereof is that a flow of warmed air is also furnished in the vicinity of the at least one operating element, so that when the machine operator reaches with his or her hands for the at least one operating element being blown onto, he or she can dip into a flow of warmed air. In the preferred case of a planar operating panel, an advantageously large space on and above that side of the operating panel which carries an operating panel can experience the flow of warmed air if the convective heating apparatus is embodied to blow warmed air over the planar element that is displaced into an operating position, substantially parallel to its area of extent.

Particularly advantageously, the stowage opening can be used to output warmed air when the operating panel, in its stowed position, is located entirely in the console body. The convective heating apparatus is therefore preferably embodied to output heated air through the aforesaid stowage opening to the operating panel that is displaced into the operating position. An output nozzle of the convective heating apparatus can be located in the interior of the console body, i.e. behind the stowage opening of the console body when viewed from the operator's platform, so that while the machine is not in use, the output nozzle can also be covered by the aforementioned cover and made inaccessible.

In principle, consideration can be given to turning the operating panel rotationally out of its stowed position into the operating position. Consideration can also be given to displacing the operating panel between a stowed position and operating position using a combined rotational and translational movement. But because a translational displacement can be sufficient to displace the operating panel out of the stowed position but not completely out of the console body, in order to allow the machine to be operated to at least a limited extent that is nevertheless sufficient for a specific utilization case, it is preferred that the operating panel be displaceable translationally between the operating position and the stowed position.

For example, if operating levers are provided on an edge region of the operating panel which is toward the front upon a displacement of the operating panel out of the stowed position, then a travel mode of the machine can be enabled by pulling the operating panel only slightly out of the console body. For loading the machine onto a lowboy trailer for delivery transport, for example, it can be sufficient if only the travel speed and travel direction of the machine are controllable, but not the working apparatus and auxiliary apparatuses thereof. The operating panel is preferably connected via a cable carrier or conductor carrier to a control device or a signal conductor in the interior of the operating console, so that regardless of the position of the operating panel relative to the console body, control inputs can always be transferred to the at least one operating element for machine control.

In earth working machines, in particular road milling machines, it is often particularly important that the machine operator be able to operate the machine as close as possible to its lateral machine edge, for example so that a terminal working region of the working apparatus, and the working result thereby achieved, can be monitored. The operating panel is therefore preferably displaceable translationally, parallel to a pitch axis of the earth working machine which extends parallel to the transverse machine direction, between a stowed position and an operating position. The machine operator can therefore, with a translational displacement of the operating panel out of its stowed position, move the operating panel along the pitch axis closer to a side edge of the machine.

To ensure that a machine is operable by the machine operator at both side edges, i.e. at both end regions of the machine along the pitch axis, it is conceivable that an operating panel can be displaceable through the console body over a very long distance. The console body can then comprise two stowage openings arranged at a distance from one another along the movement path of the operating panel, such that the operating panel can be moved into and out of the console body through each of those stowage openings. The width of the console body, however, in particular the distance of the two stowage openings from one another, is limited because a given operating panel in the console body must be reachable by the machine operator starting from both stowage openings. It is therefore more advantageous if the operating console comprises two operating panels that are each mutually independently conveyable, at different sites on the console body, into a stowed position at which they are each covered by a console body portion. Preferably both operating panels are mutually independently introducible into the console body, through a respective stowage opening, for displacement into their stowed position. The two stowage openings are preferably located at a distance from one another on opposite sides of the console body.

The statements made above regarding the operating panel apply correspondingly to the second or further operating panel and to its conformation, arrangement, and movability. The two operating panels, which are mutually independently movable preferably along a coaxial movement path between their respective positions (stowed position and operating position), are preferably displaceable out of their respective stowed position, at opposite sides of the console body, out of the latter. Each of the operating panels can thus, upon displacement into an operating position, be brought toward to a different one of two oppositely located side edges of the machine. The use of two operating panels furthermore allows the arrangement of the at least one operating element on the respective operating panel to be adapted to the operating site associated with the operating panel. The two operating panels can thus be embodied, for example, mirror-symmetrically with reference to a plane of symmetry parallel to the roll axis (longitudinal machine axis) and to the yaw axis (vertical machine axis) of the machine. In particular, a plurality of operating elements can be correspondingly arranged mirror-symmetrically on the operating panels.

The operating console can comprise a display apparatus for reporting to the machine operator and optionally also for inputting data. A display apparatus can be part of the operating panel. The machine preferably comprises a display apparatus embodied separately from the at least one operating panel. For protection from vandalism attacks while the machine is not in use, the display apparatus as well can be movable relative to the console body between an operating position, in which a display surface of the display apparatus faces toward an operating region, located in front of the operating console, in such a way that it is readable by a machine operator, and a protected position in which the display surface is located opposite a counterpart surface of the console body.

Purely in principle, the display apparatus can be movable translationally between the operating position and the protected position. But because protection of the display surface while the machine is not in use is to be achieved by creating a juxtaposition of the display surface and a counterpart surface of the console body, the display apparatus is preferably pivotable between its operating position and its protected position. A pivot axis around which the pivoting movement between the operating position and protected position occurs is preferably parallel to the pitch axis and thus also parallel to the preferred translational movement path of the at least one operating panel.

In order to protect the display surface of the display apparatus, in which context the display surface can be constituted from several separate partial display surfaces, the gap dimension between the display apparatus and counterpart surface with the display apparatus in the protected position is as small as possible, preferably less than 5 mm. In order to provide maximum protection against lever purchase in a gap constituted between the display apparatus and counterpart surface with the display apparatus in the protected position, the gap dimension between the display apparatus and counterpart surface should in fact be less than 2 mm. Particularly preferably, in the protected position the display apparatus abuts in abutting engagement against the counterpart surface with zero clearance.

In order to allow forcible shifting of the display apparatus out of the protected position to be prevented, the display apparatus can be fastenable in the protected position, against a movement out of the protected position toward the operating position, by way of a fastening apparatus. In order to protect the fastening apparatus from unauthorized manipulation, said apparatus is preferably received entirely in the console body.

In a concrete preferred embodiment of the present invention, the fastening apparatus can be embodied in terms of design in such a way that it is displaceable, by means of a part of the console body which is movable relative to an operator's platform-mounted part of the console body, between a fastened position in which the fastening apparatus fastens the display apparatus in the protected position, and a release position in which the display apparatus is movable out of the protected position into the operating position. A component necessary for shifting the fastening apparatus between a release position and fastened position is thereby always present on the operating console. The movable part of the console body with which the fastening apparatus can be actuated, i.e. moved from the release position into the fastened position, is preferably the aforementioned cover that closes off a stowage opening. Closing of the cover then not only allows the operating panel associated with the cover to be protected from external access, but also allows the display apparatus to be secured against displacement out of its protected position. If more than one stowage opening, and thus more than one cover, are present, it is sufficient if one cover is embodied for actuation of the fastening apparatus.

The fastening apparatus can comprise for that purpose a linkage and an engagement portion. An actuation end of the linkage preferably interacts with the cover, for example by way of a simple, preferably releasable, abutting engagement, so that upon displacement of the actuation end of the linkage by corresponding movement of the cover, the engagement portion of the fastening apparatus is moved into a position in which it secures the display apparatus against movement out of its protected position. In the fastened position the engagement portion is preferably in positive engagement with a securing configuration of the display apparatus that is displaced into the protected position.

In order to make it possible for the machine operator to view the display apparatus at a plurality of possible operating sites on the at least one operating panel, in the operating position the display apparatus can be mounted positionally modifiably relative to the console body. In order for one display apparatus to be usable for several operating panels, the display apparatus is preferably mounted positionally modifiably outside the console body, for example by way of a guidance rail. In accordance with the preferred embodiment recited above, the display apparatus is preferably positionally modifiable along the pitch axis of the earth working machine. The guidance rail that mounts the display apparatus for movement to different operating sites is preferably retained on the console body.

The operating console can comprise an additional operating panel in order to furnish a further operating site for operation of the machine. The additional operating panel, which is embodied separately from the aforementioned at least one operating panel, is preferably provided on the console body immovably relative thereto. For protection against vandalism attack, the additional operating panel is coverable with a covering when not in use.

In order to minimize the number of components necessary for constitution of the operating console and for protection of its individual operating arrangements, in a preferred embodiment of the invention it is conceivable that the covering of the additional operating panel encompasses or is the display apparatus, and that the counterpart surface encompasses or is the additional operating panel. The display apparatus and additional operating panel can thus advantageously be mutually protected from vandalism attack.

In order to implement a minimally bulky conformation for the additional operating panel, the latter can encompass or be a membrane operating field, in particular a membrane keypad. The additional operating panel then can be very thin in relation to its operating surface within which an operating input is possible.

It is not necessary in this context that the additional operating panel, in particular its membrane operating area, and the juxtaposed display apparatus, occupy surfaces of the same size. In the interest of a greater protective effect, the area covered by the display apparatus in its protected position is larger than the area occupied by the additional operating panel or at least by its membrane operating field. As a result, the display apparatus can cover at least the membrane operating field, preferably the entire additional operating panel, and protect it from vandalism attack.

In order to further enhance strength, preferably the at least one portion of the console body which covers an operating panel in its stowed position, and the counterpart surface, are embodied integrally, particularly preferably are manufactured without joints by original shaping and/or reshaping as one monolithic component.

As a refinement of the invention already described above, the display apparatus can comprise the securing configuration already recited above, which can be received in positive engagement by the engagement portion of the fastening apparatus. Consideration can be given in principle to allowing the display apparatus, preferably positionally modifiable relative to the console body, to be displaced into the protected position regardless of its respective operating site. This would mean, however, that the console body would need to furnish a matching counterpart surface over substantially the entire displacement range of the display apparatus. In a preferred embodiment of the present invention provision is therefore made that the securing configuration of the display apparatus, in interaction with a counterpart securing configuration of the console body, permits a movement into the protected position only when the display apparatus is in a position relative to the console body in which the display apparatus can be conveyed into juxtaposition with the additional operating panel constituting the counterpart surface. For example, the counterpart securing configuration can be a securing recess or securing opening in the console body, into which the securing configuration of the display apparatus is introducible only when the display apparatus is in a predetermined position relative to the console body. In all other relative positions of the display apparatus, however, the securing configuration collides with a portion of the console body when an attempt is made to displace the display apparatus into the protected position, and prevents such displacement.

In order to create the preferred positive engagement, the securing configuration preferably comprises a positive engagement configuration for positive fastening engagement with the engagement portion of the fastening apparatus.

BRIEF DESCRIPTION OF THE DRAWINGS

The present invention will be explained in further detail below with reference to the appended drawings, in which.

DETAILED DESCRIPTION

Figure 1:
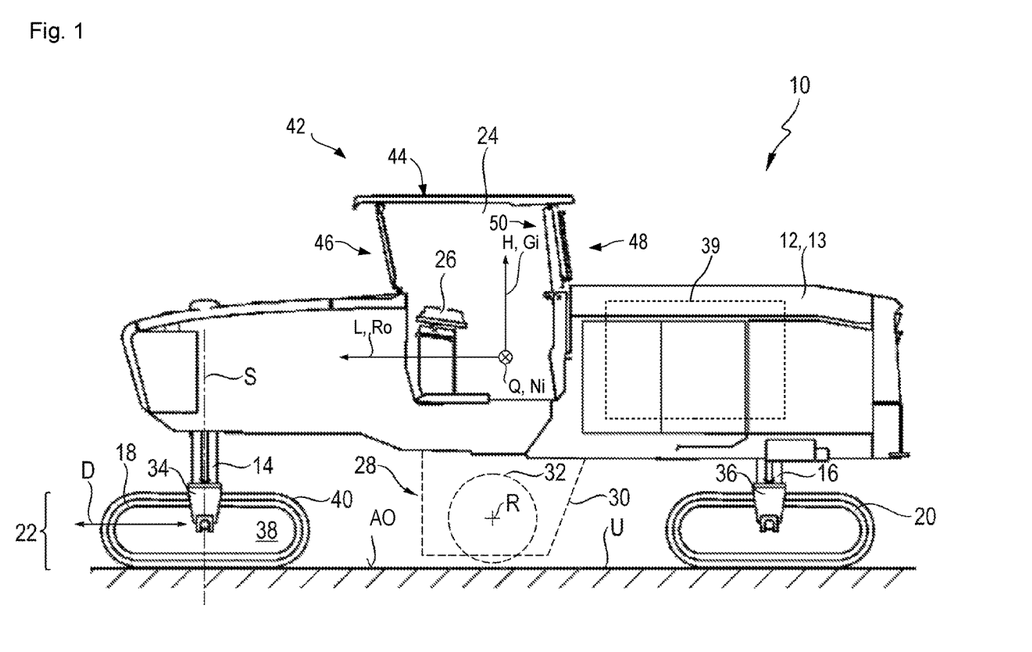
FIG. 1 is a schematic side view of an earth working machine in accordance with a use of the present invention.

In FIG. 1, an embodiment according to the present invention of an earth working machine, in the form of a large earth milling machine or road milling machine, is designated in general as 10. It encompasses a machine frame 12 that constitutes the basic framework for a machine body 13. Machine body 13 encompasses machine frame 12 and components of machine 10 which are connected to machine frame 12 and if applicable are movable relative thereto.

Machine body 13 encompasses front lifting columns 14 and rear lifting columns 16, which are connected at one end to machine frame 12 and at another end respectively to front drive units 18 and to rear drive units 20. The spacing of machine frame 12 from drive units 18 and 20 is modifiable using lifting columns 14 and 16.

Drive units 18 and 20 are depicted by way of example as crawler track units. Divergently therefrom, individual or all drive units 18 and/or 20 can also be wheel drive units.

The viewer of FIG. 1 is looking at the earth working machine, or simply "machine," 10 in transverse machine direction Q that is orthogonal to the drawing plane of FIG. 1. A longitudinal machine direction orthogonal to transverse machine direction Q is labeled L, and extends parallel to the drawing plane of FIG. 1. A vertical machine direction H likewise extends parallel to the drawing plane of FIG. 1 and orthogonally to longitudinal and transverse machine directions L and Q. The arrowhead of longitudinal machine direction L in FIG. 1 points in a forward direction. Vertical machine direction H extends parallel to yaw axis Gi of machine 10, longitudinal machine direction L extends parallel to roll axis Ro, and transverse machine direction Q extends parallel to pitch axis Ni.

Earth working machine 10 comprises an operator's platform 24 from which a machine operator can control machine 10 via an operating console 26.

Arranged below machine frame 12 is a working subassembly 28 that here constitutes, by way of example, a milling subassembly 28 having a milling drum 32 that is received in a milling drum housing 30 and is rotatable around a milling axis R extending in transverse machine direction Q, so that substrate material can thereby be removed during earth working, proceeding from supporting surface AO of substrate U, to a milling depth determined by the relative vertical position of machine frame 12. Milling drum 32 is therefore a "working apparatus" as defined in the present Application.

The vertical adjustability of machine frame 12 by way of lifting columns 14 and 16 also serves to set the milling depth, or generally working depth, of machine 10 during earth working. Alternatively or additionally, milling drum 32 can be received on machine frame 12 vertically adjustably relative thereto. Earth working machine 10 that is depicted by way of example is a large milling machine for which the arrangement of milling subassembly 28 between front and rear drive units 18 and 20 in a longitudinal machine direction L is typical. Large milling machines, or earth-removing machines in general, of this kind can comprise a transport belt for transporting removed earth material away from machine 10. A transport belt that is also present in principle on machine 10 is not depicted in FIG. 1 in the interest of better clarity.

It is not apparent from the side view of FIG. 1 that machine 10 respectively comprises, in both its front end region and its rear end region, two lifting columns 14 and 16 each having a drive unit 18, 20 connected thereto. Front lifting columns 14 are each coupled to drive units 18, in a manner furthermore known per se, by means of a drive unit connecting structure 34, for example a connecting fork that fits over drive unit 18 in transverse machine direction Q. Rear lifting columns 16 are connected to their respective drive unit 20 via a drive unit connecting structure 36 constructed identically to drive unit connecting structure 34. Drive units 18 and 20 are of substantially identical construction and constitute propelling unit 22 of the machine. Drive units 18 and 20 are motor-driven, as a rule by a hydraulic motor (not depicted).

The drive energy source of machine 10 is constituted by an internal combustion engine 39 which is received on machine frame 12 and by which, in the exemplifying embodiment depicted, milling drum 32 is driven to rotate. The output of internal combustion engine 39 furthermore furnishes on machine 10 a hydraulic pressure reservoir with which hydraulic motors and hydraulic actuators on the machine are operable. Internal combustion engine 39 is thus also a source of the energy that advances machine 10.

In the example depicted, drive unit 18, having a running direction indicated by double arrow D, comprises a radially internal receiving and guidance structure 38 on which a recirculatable crawler track 40 is arranged and is guided to move peripherally.

Lifting column 14, and with it drive unit 18, is rotatable by means of a steering apparatus (not depicted in further detail) around a steering axis S. Preferably additionally but also alternatively, lifting column 16, and with it drive unit 20, can be rotatable by means of a steering apparatus around a steering axis parallel to steering axis S.

Operator's platform 24 is covered by a protective canopy structure 42 that is liftable and lowerable by means of a movement guidance system 50 and encompasses a protective canopy 44 that is connected to machine frame 12 or machine body 13 respectively via a front panel arrangement 46 and a rear partition arrangement 48.

Figure 2:
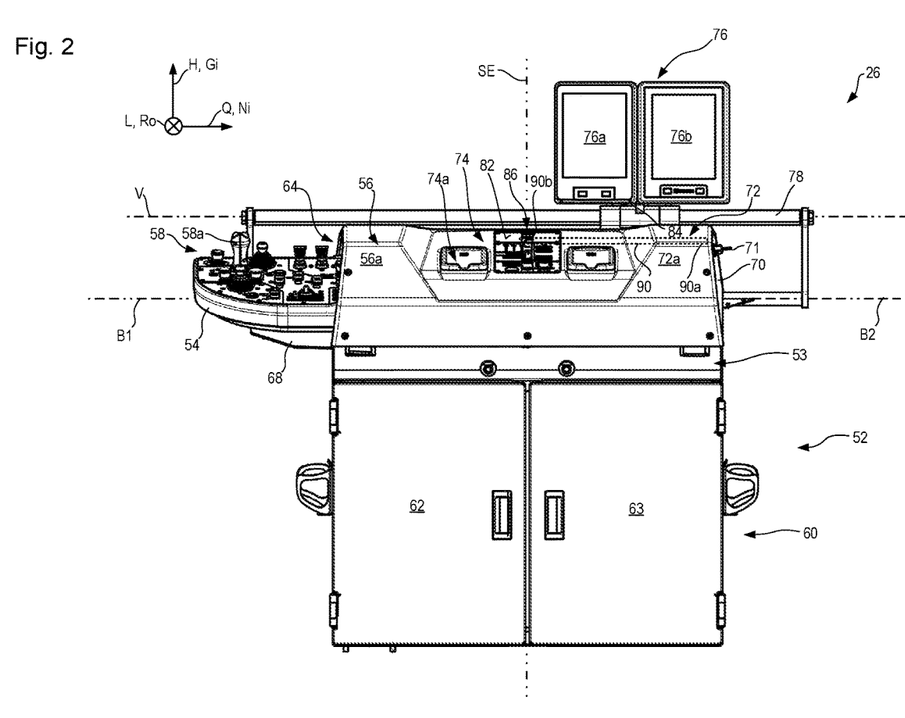
FIG. 2 is a front view of the operating console of the earth working machine of FIG. 1, with one operating panel in the operating position and one operating panel in the stowed position.

FIG. 2 depicts operating console 26 in a front view, i.e. from a viewing position of a machine operator who is operating machine 10 in an operating region. Operating console 26 comprises a console body 52 and a first operating panel 54 that is movable relative to console body 52 along a movement path B1 parallel to pitch axis Ni. In FIG. 2, operating panel 54 is in its operating position pulled completely out of a storage compartment 56 of console body 52, in which position all the operating elements 58 arranged on operating panel 54 are accessible to the machine operator as intended.

Console body 52 is fabricated from a material mix of metal on the one hand and a robust material, having a low density and therefore low weight, on the other hand, for example a styrene-based plastic that is e.g. fiber-reinforced for further strength enhancement.

A lower part of operating console 26 and of console body 52, which stands on the operator's platform floor (not depicted in FIG. 2) and is secured thereto, is embodied e.g. as an electrical cabinet 60 for the reception of electrical circuits. This part is preferably made of metal. Two doors 62 and 63, articulated pivotably as moving parts on an operator's platform-mounted framework part 53 (see FIG. 5) of console body 52, close off electrical cabinet 60.

Operating console 26 is constructed substantially mirror-symmetrically with reference to a mirror symmetry plane SE parallel to yaw axis Gi and to roll axis Ro.

Earth working machine 10 can be operated using operating elements 58 of first operating panel 54.

For protection from vandalism attacks, first operating panel 54 is introducible, along pitch axis Ni along movement path B1 through a stowage opening 64 on the left side (in FIG. 2) of the upper part of console body 52, entirely into console body 52. It is then located, like second operating panel 66 that is not depicted in FIG. 2 but is depicted in FIG. 3, entirely in storage compartment 56 provided for first operating panel 54 on console body 52.

Storage compartment 56 of first operating panel 54 is dome-shaped in its upper region 56*a* in order to receive physically protruding operating elements 58, for example a joystick 58*a*. This upper region 56*a* is preferably constituted from a composite material made of ASA and ABS.

Figure 4:
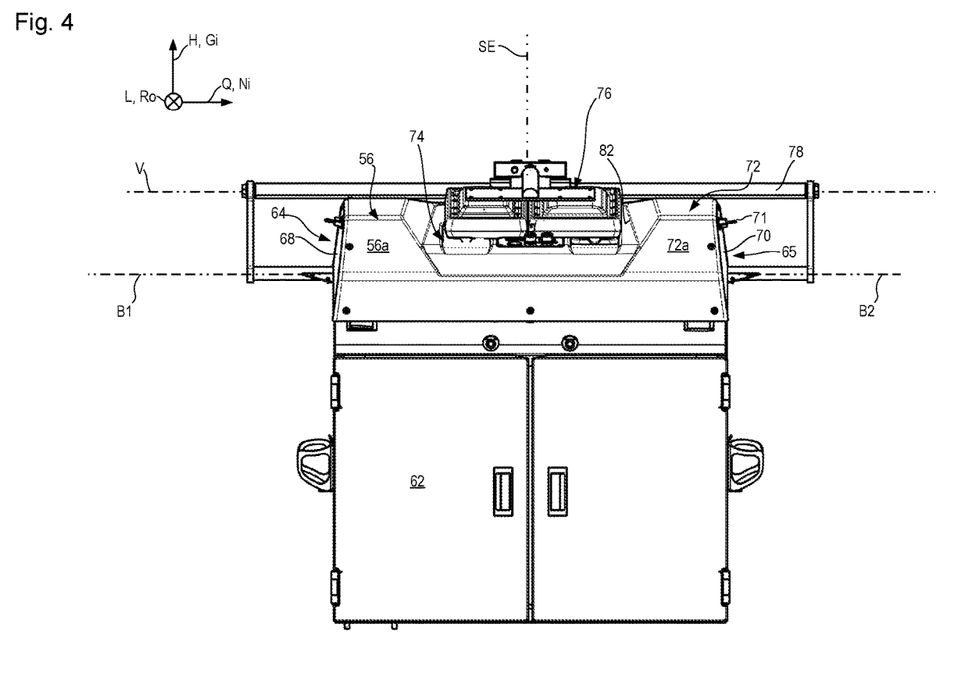
FIG. 4 shows the operating console of FIGS. 2 and 3, once again in a front view, with both operating panels in the stowed position.
Figure 5:
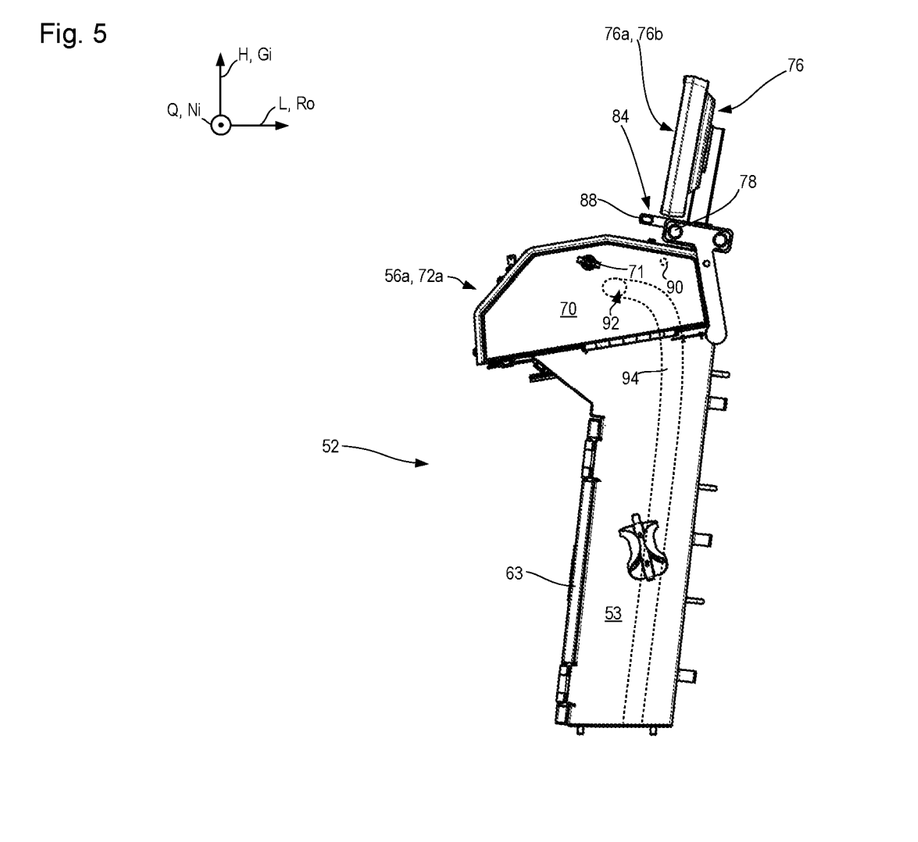
FIG. 5 is a side view of the operating console of FIGS. 2 to 4.

Stowage opening 64 can be closed off by a cover 68 articulated pivotably on console body 52. Cover 68, which is likewise preferably manufactured from ASA and/or ABS, is shown in FIGS. 2 and 3 in its open position and in FIG. 4 in its locked position. In the locked position, cover 68, like cover 70 of second operating panel 66 which is juxtaposed with it on the opposite side of console body 52, can be locked in order to secure covers 68 and 70 against unauthorized opening and thus to prevent unauthorized access to operating panels 54 and 66. A key 71 with which second cover 70 is lockable is depicted in FIGS. 2, 4, and 5.

Figure 3:
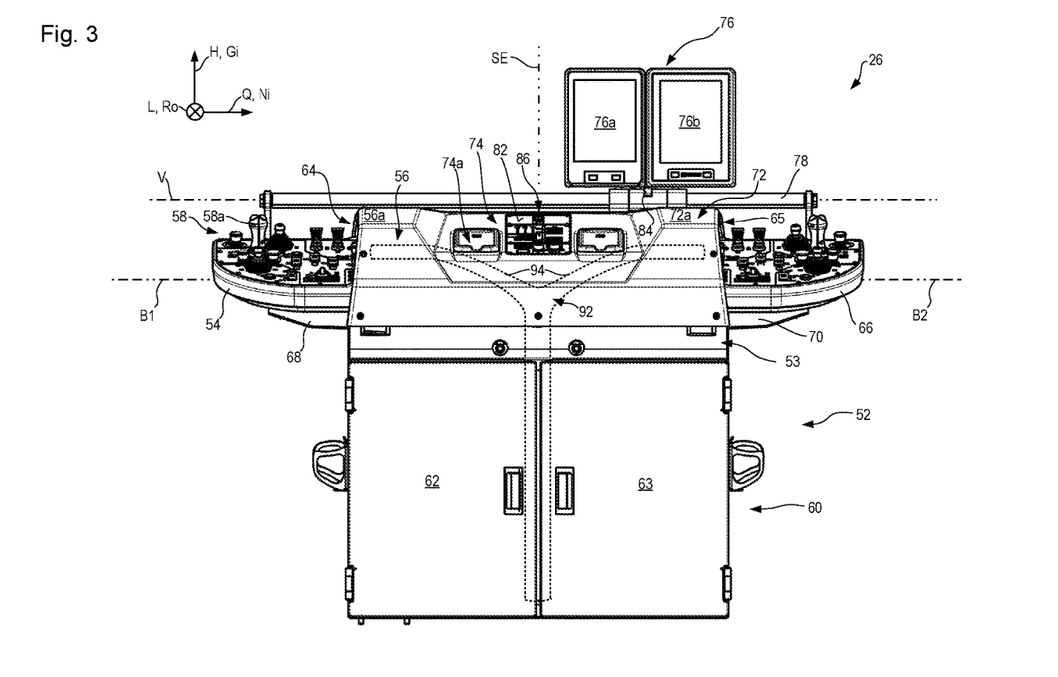
FIG. 3 shows the operating console of FIG. 2, also in a front view, with both operating panels in the operating position.

Divergently from the respective operating positions of first and second operating panels 54 and 66 as shown in FIG. 3 which are pulled entirely out of console body 52, first operating panel 54 and/or second operating panel 66 can also be pulled only partly out of console body 52 into an operating position, for example if all that is needed is a subset of operating elements 58 which is arranged at a leading end region of operating panels 54 and/or 66 in the pulling-out direction from console body 52.

Operating panels 54 and 66 can be mutually independently pulled out of and introduced into their respective storage compartments 56 and 72.

In addition to the two operating panels 54 and 66 that are movable, in particular translationally movable, relative to console body 52, console body 52 comprises, in a region between the upper dome-shaped regions 56*a* and 72*a* (the dome-shaped upper region 72*a* being part of storage compartment 72, which in accordance with the above-described mirror symmetry is provided on console body 52 for stowage of second operating panel 66 shown in FIG. 3), an additional operating panel 74 that is arranged in stationary fashion on console body 52. Additional operating panel 74 encompasses a space-saving membrane operating field 74*a* that can be arranged flat on console body 52 without protruding greatly outward or even inward beyond an outer surface of the placement region on console body 52.

Upper region 72*a* is also preferably constituted from ASA and/or ABS, as is cover 70.

Operating console 26 furthermore comprises a display apparatus 76 embodied separately from operating panels 54 and 66 and also separately from additional operating panel 74. Display apparatus 76, which comprises two display surfaces 76*a* and 76*b*, is displaceable on a guidance rail 78 along a displacement axis V parallel to pitch axis Ni. Display apparatus 76 can thus be conveyed along pitch axis Ni to an operating site of first operating panel 54, to an operating site of additional operating panel 74, or to an operating site of second operating panel 66, and can display information to the particular machine operator who is working there. Display surfaces 76*a* and 76*b* can also be embodied in contact-sensitive fashion as touchscreens for the input of data.

Display apparatus 76 not only is displaceable translationally along guidance rail 78 but is also, thanks to mounting by way of a linear rolling element bearing, pivotable around guidance rail 78 between its operating position depicted in FIGS. 2, 3, and 5 and its protected position shown in FIG. 4.

In its operating position (see FIGS. 2, 3, and 5), display apparatus 76 can be read as intended by a machine operator standing in the operating region in front of operating console 26. In the protected position shown in FIG. 4, display surfaces 76*a* and 76*b* of display apparatus 76 are located at a short distance, or preferably with zero clearance, opposite a counterpart surface 82 of console body 52 which comprises additional operating panel 74.

Counterpart surface 82 of console body 52, like housing parts of display apparatus 76 which face away from console body 52, and are therefore accessible, when display apparatus 76 is in the protected position, are manufactured from ASA and/or ABS. Regions 56*a*, 72*a*, and 82 of console body 52 are preferably embodied integrally, particularly preferably (in the interest of enhanced strength) as a monolithic component by being manufactured without joints.

Second operating panel 66, which is also movable translationally relative to console body 52, specifically along a movement path B2 coaxial with movement path B1 of first operating panel 54, is in its stowed position in FIG. 4. First operating panel 54 is also in its stowed position; the two covers 68 and 70 are each in their locked positions, and close off the respective stowage openings 64 and 65. FIG. 4 therefore shows an arrangement of operating console 26 in which the operating console and its operating panels 54, 66, and 74, as well as display apparatus 76, are maximally protected against a vandalism attack.

Even the wall of console body 52, several millimeters thick and made of metal and/or plastic, in particular of ASA and/or ABS with a particle filler and/or fiber filling, can be overcome with sufficient force or criminal energy, but an attacker requires considerably more time to seriously damage operating console 26 than if the operating panels were unprotectedly accessible. A vandal must therefore spend a longer time generating noise while acting out his destructiveness, and thus being discovered.

Particularly easily visible in FIG. 5 is a securing configuration 84, connected for movement together with display apparatus 76, which projects out from display apparatus 76 principally parallel to roll axis Ro, at a slight angle therefrom. Securing configuration 84, embodied by way of example as a rod, is introducible, upon pivoting of display apparatus 76 out of its operating position into the protected position shown in FIG. 4, into a securing recess 86 in the region of additional operating panel 74. Securing recess 86 is dimensioned so that securing configuration 84 is introducible thereinto only when display apparatus 76 is located at the transverse center of console body 52 with sufficient accuracy that, upon pivoting around guidance rail 78, said apparatus comes into abutment against additional operating panel 74 or against counterpart surface 82 comprising additional operating panel 74. When display apparatus 76 is in its protected position, display apparatus 76 and additional operating panel 74 thus conceal and protect one another against unauthorized access, in particular forcible access.

As is evident from FIG. 5, securing configuration 84 comprises an eye 88 that passes through it parallel to pitch axis Ni and constitutes a positively engaging configuration.

As depicted only in FIGS. 2 and 5 in the interest of clarity, a fastening apparatus 90 in the form of a bar is provided in the interior of console body 52. As it approaches its locked position, cover 70 comes into abutting engagement with an actuation end 90a of fastening apparatus 90. After establishment of the abutting engagement with cover 70 by the closing of cover 70 (conveying of the cover into its locked position shown in FIG. 2), fastening apparatus 90, which is preloaded into its release position in which it does not pass through securing recess 86, is moved, against the preload force acting toward the release position, into the fastened position in which an engagement portion 90b passes through securing recess 86. When securing configuration 84 is located in securing recess 86 because display apparatus 76 has been conveyed into its protected position shown in FIG. 4, engagement portion 90a of fastening apparatus 90 passes, in its fastened position, through eye 88 of securing configuration 84 and thus establishes a positive engagement that prevents a displacement of display apparatus 76 out of the protected position that has been reached. Operating console 26 is then almost hermetically closed off. All sensitive components that are necessary for machine operation are surrounded by the robust envelope of console body 52 and are not directly accessible to forcible attack.

Upon opening of cover 70, fastening apparatus 90 is displaced by its preload into the release position in which securing recess 86, and with it eye 88, are no longer passed through by engagement portion 90b. Display apparatus 76 can then be conveyed back into its operating position.

In FIGS. 3 and 5, a convective heating apparatus 92 arranged in the interior of console body 52 is indicated with dashed lines. The convective heating apparatus encompasses substantially a hot air conduit 94 that passes through console body 52 toward the bottom. A further hot air conduit, carrying air that is warmer compared with ambient air, of machine 10, can thus be connected to hot air conduit 94. Hot air carried by the hot air conduit of machine 10 can thus also be directed through hot air conduit 94 of operating console 26 and of console body 52. Outlets of convective heating apparatus 92 are located in the interior of console body 52, respectively behind stowage openings 64 and 65. Heating apparatus 92 blows hot air respectively through stowage openings 64 and 65 substantially parallel to the respective movement paths B1 and B2, in a direction away from operating console 26, over those surfaces of operating panels 54 and 66 which are populated with operating elements 58. It is thereby possible to generate, above the respective operating panels 54 and/or 66, a warm-air region into which the machine operator dips his or her hand when reaching for operating elements 58. Heating apparatus 92 can be switched off, in its entirety or in terms of a branch associated with one operating panel 54 or 66, to prevent hot air from flowing onto a closed cover 68 or 70. The capability for switching off can be implemented in a manner known per se by way of actuatable valves (not depicted) or also by way of a fan that can be switched off.

The invention claimed is:

1. An earth working machine, comprising:
   a propelling unit;
   a machine frame carried by the propelling unit;
   a working apparatus supported from the machine frame for earth working; and
   an operator's platform provided on the machine frame, the operator's platform including an operating console, the operating console including a console body and an operating panel movable relative to the console body, the operating panel including at least one operating element;
   wherein the operating panel is translationally displaceable, in a direction parallel to a pitch axis of the earth working machine which extends parallel to a transverse machine direction, between a stowed position and an operating position, the at least one operating element being covered by a portion of the console body when the operating panel is in the stowed position, and the at least one operating element being uncovered and therefore accessible for operation thereof by a machine operator when the operating panel is in the operating position.

2. The earth working machine of claim 1, wherein:
   the console body includes a stowage opening through which the operating panel is displaceable into the stowed position such that the operating panel is completely received in the console body when the operating panel is in the stowed position.

3. The earth working machine of claim 2, wherein:
   the console body includes a cover movable between an open position and a locked position, wherein when the cover is in the locked position and the operating panel is in the stowed position the cover closes off the stowage opening thereby protecting the operating panel against displacement out of the stowed position, and wherein when the cover is in the open position the cover exposes the stowage opening for movement of the operating panel.

4. The earth working machine of claim 1, further comprising:
   a convective heating apparatus disposed in the operating console and configured to direct heated air, having a higher temperature than an ambient air temperature, to the operating panel when the operating panel is in the operating position.

5. The earth working machine of claim 4, wherein:
   the console body includes a stowage opening through which the operating panel is displaceable into the stowed position such that the operating panel is completely received in the console body in a storage region when the operating panel is in the stowed position; and
   the convective heating apparatus is configured to output the heated air from the storage region through the stowage opening to the operating panel in the operating position.

6. The earth working machine of claim 1, wherein:
   the operating console includes a second operating panel movable relative to the console body, the second operating panel including at least one operating element;
   wherein the second operating panel is displaceable between a stowed position and an operating position, the at least one operating element of the second operating panel being covered by a portion of the console body when the second operating panel is in its stowed position, and the at least one operating element of the second operating panel being uncovered and therefore accessible for operation thereof by the machine operator when the second operating panel is in its operating position.

7. The earth working machine of claim 1, wherein:
the operating console further includes a display apparatus movable between an operating position and a protected position, wherein when the display apparatus is in its operating position a display surface of the display apparatus faces toward an operating region located such that the display surface is readable by the machine operator, and wherein when the display apparatus is in its protected position the display surface is located opposite a counterpart surface of the console body.

8. The earth working machine of claim 7, wherein:
the operating console further includes a fastening apparatus configured to fasten the display apparatus against movement out of its protected position toward its operating position, the fastening apparatus being received entirely within the console body.

9. The earth working machine of claim 8, wherein:
the console body includes a stowage opening through which the operating panel is displaceable into the stowed position such that the operating panel is completely received in the console body when the operating panel is in the stowed position;
the console body includes a cover movable between an open position and a locked position, wherein when the cover is in the locked position and the operating panel is in the stowed position the cover closes off the stowage opening thereby protecting the operating panel against displacement out of the stowed position, and wherein when the cover is in the open position the cover exposes the stowage opening for movement of the operating panel; and
the fastening apparatus is configured to be displaced by the cover between a release position and a fastened position, wherein when the fastening apparatus is in the release position the display apparatus is movable out of its protected position into its operating position, and wherein when the fastening apparatus is in the fastened position the display apparatus is fastened in its protected position.

10. The earth working machine of claim 7, wherein:
the display apparatus is mounted positionally modifiably relative to the console body such that the display apparatus is movable along a pitch axis of the earth working machine.

11. The earth working machine of claim 1, wherein:
the operating console further includes an additional operating panel on the console body and immovable relative to the console body, and a covering configured to cover the additional operating panel when the additional operating panel is not in use.

12. An earth working machine, comprising:
a propelling unit;
a machine frame carried by the propelling unit;
a working apparatus supported from the machine frame for earth working; and
an operator's platform provided on the machine frame, the operator's platform including an operating console, the operating console including a console body and an operating panel movable relative to the console body, the operating panel including at least one operating element;
wherein the operating panel is displaceable between a stowed position and an operating position, the at least one operating element being covered by a portion of the console body when the operating panel is in the stowed position, and the at least one operating element being uncovered and therefore accessible for operation thereof by a machine operator when the operating panel is in the operating position;
wherein the operating console further includes an additional operating panel on the console body and immovable relative to the console body, and a covering configured to cover the additional operating panel when the additional operating panel is not in use;
wherein the operating console further includes a display apparatus movable between an operating position and a protected position, wherein when the display apparatus is in its operating position a display surface of the display apparatus faces toward an operating region located such that the display surface is readable by the machine operator, and wherein when the display apparatus is in its protected position the display surface is located opposite a counterpart surface of the console body; and
wherein the display apparatus includes the covering and the counterpart surface includes the additional operating panel.

13. The earth working machine of claim 12, wherein:
the display apparatus is mounted positionally modifiably relative to the console body such that the display apparatus is movable along a pitch axis of the earth working machine; and
the display apparatus includes a securing configuration engageable with a counterpart securing configuration of the console body such that movement of the display apparatus into the protected position is permitted only when the display apparatus is in a predetermined position relative to the console body.

14. The earth working machine of claim 13, wherein:
the operating console further includes a fastening apparatus configured to fasten the display apparatus against movement out of its protected position toward its operating position; and
the securing configuration includes a positive engagement configuration for positive fastening engagement with the fastening apparatus.

15. A method of operating an earth working machine, the earth working machine including:
a propelling unit;
a machine frame carried by the propelling unit;
a working apparatus supported from the machine frame for earth working; and
an operator's platform provided on the machine frame, the operator's platform including an operating console, the operating console including a console body and an operating panel movable relative to the console body, the operating panel including at least one operating element;
wherein the method comprises steps of:
(a) operating the at least one operating element when the operating panel is in an operating position wherein the at least one operating element is uncovered; and
(b) translationally displacing the operating panel from the operating position to a stowed position in a direction parallel to a pitch axis of the earth working machine which extends parallel to a transverse machine direction, wherein the at least one operating element is covered by a portion of the console body.

16. The method of claim 15, wherein:
step (b) further comprises displacing the operating panel through a stowage opening of the console body so that the operating panel is completely received in the console body when the operating panel is in the stowed position.

17. The method of claim 16, further comprising:
closing the stowage opening by movement of a cover to a closed position after the operating panel is in the stowed position; and
locking the cover in the closed position and thereby preventing displacement of the operating panel out of the stowed position.

18. The method of claim 17, further comprising:
moving a display apparatus from an operating position wherein the display apparatus is readable by a machine operator, to a protected position wherein the display apparatus is located opposite a counterpart surface of the console body.

19. The method of claim 18, wherein:
the step of closing the stowage opening further includes fastening the display apparatus in its protected position by the movement of the cover to the closed position.

* * * * *